United States Patent [19]

Iwata et al.

[11] 4,414,254
[45] Nov. 8, 1983

[54] SELECTIVE LIGHT-TRANSMITTING LAMINATED STRUCTURE

[75] Inventors: Kaoru Iwata; Toshio Nishihara, both of Hachioji; Michisuke Ohe; Yoichi Saito, both of Hino; Akihiro Horike, Mihara, all of Japan

[73] Assignee: Teijin Limited, Osaka, Japan

[21] Appl. No.: 333,774

[22] Filed: Dec. 23, 1981

[30] Foreign Application Priority Data

Dec. 26, 1980 [JP] Japan ................... 55-183725
Dec. 29, 1980 [JP] Japan ................... 55-185293
Feb. 12, 1981 [JP] Japan ................... 56-17963

[51] Int. Cl.³ .................... E06B 3/24; B32B 27/40
[52] U.S. Cl. .................... 428/34; 428/216; 428/424.7; 428/425.8; 428/433; 428/457; 428/458; 428/463; 428/480; 428/522
[58] Field of Search ........... 428/424.7, 425.9, 463, 428/425.8, 216, 34, 433, 457, 458, 522, 480

[56] References Cited

U.S. PATENT DOCUMENTS 4,027,061 5/1977 Eartier ................... 428/424.7
4,166,876 9/1979 Chiba ................... 428/425.9
4,226,910 10/1980 Dahlen ................... 428/463
4,268,570 5/1981 Imanaka ................... 428/463

Primary Examiner—Ellis P. Robinson
Attorney, Agent, or Firm—Sherman & Shalloway

[57] ABSTRACT

In a selective light-transmitting laminated structure comprising (a) a laminate composed of a transparent substrate and formed on at least one surface of the substrate, a thin metallic layer and/or a thin metal oxide layer, if required in combination with a thin film layer having a high refractive index, and (b) a protective layer composed mainly of a polymer having structural units of the general formula

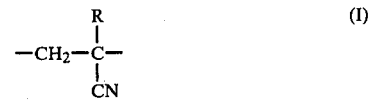

wherein R represents a hydrogen atom or a methyl group, as main structural units, the improvement wherein a urethan linkage exists in the interface between the laminate (a) and the protective layer (b).

17 Claims, No Drawings

SELECTIVE LIGHT-TRANSMITTING LAMINATED STRUCTURE

This invention relates to a selective light-transmitting laminated structure having improved resistance to spotting. More specifically, it relates to a selective light-transmitting laminated structure having a high visible light transmittance, a high infrared reflectance, excellent abrasion resistance and excellent resistance to spotting by moisture, rainwater, etc.

An example of the selective light-transmitting laminated structure is a transparent thermally insulating laminate film which is transparent to visible light and can reflect infrared light. Laminated structures having such properties are expected to find applications as windowpanes of buildings, vehicles and aircraft and windows of cooled or refrigerated showcases. The function of such a laminated structure as a transparent thermally insulating window intended for utilization of solar energy and saving of energy will become increasingly important.

Heretofore, laminates obtained by sandwiching a thin metallic film layer between transparent thin layers having a high refractive index, such as $Bi_2O_3/Au/Bi_2O_3$, $ZnS/Ag/ZnS$ or $TiO_2/Ag/TiO_2$ formed by vacuum deposition, reactive vapor deposition, chemical coating or sputtering, have been proposed as selective light-transmitting laminates for achieving this end. Laminates containing silver as a metallic layer have especially good transparency in the visible light region and especially high ability to reflect infrared light because of the optical properties of silver itself.

When such a laminate is to be used as a transparent thermally insulating windowpane, it is required to have various practical properties such as abrasion resistance and resistance to the occurrence of spotting in addition to retaining its inherent properties such as visible light transmittability and infrared light reflecting ability. Generally, however, most laminates which include such a very thin metal or metal oxide film as in the above-exemplified laminates have insufficient abrasion resistance or spotting resistance. No problem will arise when such laminates are used between a multiplicity of glass layers. But to use them in direct contact with the outer atmosphere, it is necessary to provide a protective coating thereon.

The present inventors previously studied various protective coating agents in order to increase the practical applicability of these laminates, and found that many protective coating agents can improve their abrasion resistance but at the same time markedly reduce their ability to reflect infrared light, i.e. heat waves. On investigating into the cause of this phenomenon, the present inventors found that the protective layer absorbs most of infrared rays and the absorbed infrared ray energy is again radiated as heat waves and transmitted to the surroundings by conduction or convection. The following problems, therefore, arise when a protective layer is to be applied to a selective light-transmitting laminate.

(1) If the thickness of the protective layer is too large, its protecting function increases, but the ratio of infrared absorption increases and consequently the ability of the resulting laminated structure to reflect infrared light is drastically reduced. When general protective coating agents are used, a considerable decrease in the infrared light reflecting ability of the laminated structure is inevitable if the thickness of the protective layer is 1.5 $\mu$m or more.

(2) Protective film thicknesses of about 0.3 $\mu$m to about 1.5 $\mu$m are suitable for the purpose of this invention in that they do not cause a reduction in infrared light reflecting ability. However, since upon exposure to visible light a rainbow-colored interference fringe occurs in a protective coating having a thickness within this range, such a protective film cannot be used for ordinary applications.

(3) If the film thickness is further decreased, the absorption of light in the infrared region progressively decreases and the occurrence of the interference fringe can be avoided. However, the abrasion resistance of the protective film is drastically reduced. For example, layers of general protective coating agents having such a thickness as to avoid interference, i.e. not more than 0.3 $\mu$m, cannot be expected to function sufficiently for protective purposes.

The present inventors previously found that the use of a polymer consisting mainly of acrylonitrile or methacrylonitrile (to be inclusively referred to as (meth)acrylonitrile) as a protective layer resolves the above inconsistency, and makes it possible to retain excellent selective light-transmitting ability while improving abrasion resistance (see Japanese Laid-Open Patent Publication No. 149909/1980).

Selective light-transmitting laminated structures including such a protective layer can be used without troublesome problems at relatively low temperatures, for example in refrigerated or cooled showcases. But when they are used for a long period of time in places directly exposed to high temperatures, high humidities, extreme heat-cold cycles, wind, and rain (for example, in the case of sunlight controlling films), the formation of spots on the laminated structures cannot be avoided. Under these circumstances, it is desired to inhibit spotting while retaining the low infrared absorption, high abrasion resistance and high durability to heat, light, etc. of the poly(meth)acylonitrile.

A film of an olefinic polymer such as polyethylene or polypropylene may possibly be used as a protective film having a satisfactory ability to reflect heat waves and satisfactory spotting resistance. Such films, however, are not practical because, for example, a polyethylene protective film has poor scratch resistance, and a polypropylene protective film is susceptible to photodegradation by sunlight, etc. and is therefore limited in the form in which it is used.

It is an object of this invention therefore to provide a selective light-transmitting laminated structure including a protective layer which has resistance to spotting while retaining the excellent properties of poly(meth)acrylonitrile.

According to this invention, there is provided a selective light-transmitting laminated structure comprising (a) a laminate composed of a transparent substrate and formed on at least one surface of the substrate, a thin metallic layer and/or a thin metal oxide layer, if required in combination with a thin film layer having a high refractive index, and (b) a protective layer composed mainly of a polymer having structural units of the general formula

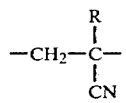

(I)

wherein R represents a hydrogen atom or a methyl group, as main structural units; characterized in that a urethan linkage exists in the interface between the laminate (a) and the protective layer (b).

In one embodiment of this invention, the urethan linkage is derived from a urethan linkage-containing polymer existing between the laminate (a) and the protective layer (b). The urethane linkage-containing polymer preferably has a three-dimensional network structure, although it may be of a linear structure.

Preferably, the urethan linkage-containing polymer having a three-dimensional network structure is formed by reacting a polymer having a hydroxyl group in a side chain with a difunctional or higher polyisocyanate. The polymer having a hydroxyl group in a side chain is preferably a hydroxyl-containing polymer containing at least 2 mole% of structural units of the following general formula

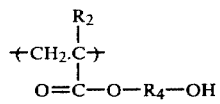

(II)

wherein $R_2$ represents a hydrogen atom or a methyl group, and $R_4$ represents a hydrocarbon group having not more than 10 carbon atoms, preferably not more than 8 carbon atoms, which may contain an oxygen or nitrogen atom, provided that the oxygen atom may exist as an ether linkage or a hydroxyl group and the nitrogen atom may exist as a tertiary amino linkage; more preferably a hydroxyl-containing copolymer composed mainly of structural units of the following general formula

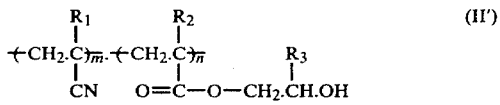

(II')

wherein $R_1$ and $R_2$ are identical or different and each represents a hydrogen atom or a methyl group, $R_3$ represents a hydrogen atom, a group of the formula —CH$_2$—OR$_7$ in which $R_7$ represents an alkyl group having 1 to 6 carbon atoms or a phenyl group, or a group of the formula

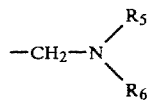

in which $R_5$ and $R_6$ are identical or different and each represents an alkyl group having 1 to 6 carbon atoms, a 2-hydroxyethyl group or a 2-hydroxypropyl group, and m and n are integers.

In the above embodiment of this invention, the protective layer (b) preferably has no urethan linkage and is composed substantially only of the structural units of formula (I).

In another embodiment of this invention, the urethan linkage present in the interface between the laminate (a) and the protective layer (b) may be bonded to the polymer which constitutes the protective layer (b). Preferably, the protective layer (b) having a urethan linkage is composed of a crosslinked urethan polymeric compound formed by reacting the aforesaid hydroxyl-containing copolymer composed mainly of the structural units of general formula (II) with a polyisocyanate whereby at least a part of the hydroxyl groups in the hydroxyl-containing copolymer reacts to form a urethan crosslinkage.

By the presence of a urethan linkage in the interface between the laminate (a) comprising a thin metallic layer and/or a thin metal oxide layer optionally in combination with a thin film layer having a high refractive index and the protective layer (b), the occurrence of spots on the selective light-transmitting laminated structure of the invention can be reduced greatly even when it is exposed to high temperature and high humidity or to en environment in which extreme heat-cold cycles occur. In addition, the excellent protecting properties of the poly(meth)acrylonitrile can be retained.

The selective light-transmitting laminated structure of this invention is especially useful in applying to openable double windows which are widely used in districts of cold climate. Generally, it is preferred that such a selective light-transmitting laminated structure be provided on the outdoor-facing side of that glass plate of a double window which faces indoors in order to increase the amount of solar energy falling indoors. This is because the selective light-transmitting laminated structure permits transmission of solar energy but simultaneously absorbs solar energy to some extent. In a double window including the aforesaid selective light-transmitting laminated structure, sunlight which has been transmitted through the glass plate on the outdoor side falls directly upon the protective layer of the selective light-transmitting laminated structure.

It has been found in accordance with this invention that the polypropylene protective film mentioned above undergoes photodegradation by the light which has been transmitted through a glass plate, whereas the protective coating in accordance with this invention shows excellent light resistance and has a utilitarian value. For example, in an accelerated light resistance test to be described hereinbelow, the protective coating in accordance with this invention showed no change in appearance after 2000-hour exposure and retained its basic properties; whereas the polypropylene protective film underwent cracking by light irradiation, and after about 1000-hour exposure, viewability through the protective coating became poor.

In the laminated structure of this invention, the laminate (a) having selective light-transmitting ability is obtained by laminating a thin metallic layer and/or a thin metal oxide layer, optionally in combination with a thin film layer having a high refractive index, onto at least one surface of a transparent substrate.

The transparent substrate as a base of the selective light-transmitting laminate (a) used in this invention may be an organic or inorganic molded article or a composite of these. Examples of the organic molded articles are molded articles of polyethylene terephthalate, polyethylene naphthalate, polybutylene terephthalate, polycarbonate, polyvinyl chloride, acrylic resins, polyamides and polypropylene. Examples of the inorganic molded articles are molded articles of glasses such as soda glass and borosilicate glass and metallic oxides such as alumina, magnesia, zirconia and silica.

The molded articles may be in any form such as a plate, sheet or film. Depending upon the end uses, the substrate may be colored or non-colored. From the viewpoint of processability, the molded articles are preferably in the form of sheets, films and plates. From the viewpoint of productivity, film-like molded articles are especially preferred. Polyethylene terephthalate films are most preferred in view of their excellent transparency, strength, dimensional stability and adhesion to coated layers.

These films may be pre-treated by corona discharge, flow discharge, flaming, ultraviolet radiation or electron bombardment, ozone oxidation, hydrolysis, etc., or pre-coated with an adhesive layer in order to increase their adhesion to the layers to be applied thereto.

The thin metallic layer may be prepared from silver, gold, copper, aluminum, nickel, palladium, tin or the alloys or mixtures thereof. Silver, gold, copper and the alloys or mixtures thereof are preferred. The thickness of the metallic layer is 30 to 500 Å, preferably 50 to 200 Å. Thin metallic layers having a thickness within the above-specified range are preferred from the standpoint of both transparency and heat insulating property.

The thin metallic layer may be a single layer or a combination of a multiplicity of layers of different metals.

Examples of especially preferred thin metallic layers are (1) a silver layer or a silver-copper alloy layer having a thickness of 100 to 200 Å (in the case of the alloy layer, the proportion of copper is 5 to 15% by weight), and (2) a silver-gold alloy layer having a thickness of 100 to 200 Å.

The material for the metal oxide layer includes, for example, indium oxide, tin oxide, cadmium oxide, and mixtures of these.

When a thin metallic layer is interposed between dielectric layers having a high refractive index, the visible light transmittance of the metallic layer increases. This can be demonstrated by the calculations made on the basis of the descriptions in Chapters 2 and 4 of "Optics of Thin Film (An Optical Multilayer Theory)" by Dr. Zdenek Knittl, John Wiley & Sons, Inc., 1976, New York. This has also been confirmed with regard to a laminated structure actually obtained.

Accordingly, in the present invention, too, it is preferred to use a thin film layer having a high refractive index in combination with the thin metallic layer.

The thin film layer having a high refractive index which can be used in this invention may be made of at least one compound selected from titanium dioxide, titanium oxide, bismuth oxide, zinc sulfide, tin oxide, zirconium oxide, indium oxide, silicon oxide, etc.

The thin film layer having a high refractive index has a high refractive index to visible light. Those having a refractive index of usually at least 1.4, preferably at least 1.6, especially preferably at least 1.8, and a visible light transmittance of at least 70%, preferably at least 80%, are effective. The high-refractive thin film layer has a thickness of 40 to 600 Å, preferably 80 to 400 Å.

Thus, specific examples of the selective light-transmitting laminate (a) before lamination of the protective layer (b) are given below. Those obtained by providing a very thin layer of Ti, C, Ni, Co, Cr, etc. on one or both surfaces of these metallic layers are more preferred.

(1) PET/$TiO_x$/Ag/$TiO_x$
(2) PET/$TiO_x$/Ag—Cu/$TiO_x$
(3) PET/$TiO_x$/Ag—Au/$TiO_x$
(4) PET/$TiO_x$/Ag—Au—Cu/$TiO_x$
(5) PET/ZnS/Ag/ZnS
(6) PET/$TiO_x$/Ag—Cu/$SnO_2$
(7) PET/$TiO_x$/Ag—Cu—Cu/ZnS
(8) PET/$Bi_2O_3$/Ag—Au/$Bi_2O_3$
(9) PET/Ni/Au/$SiO_2$
(10) PET/Ni/Au
(11) PET/Au/$TiO_x$
(12) PET/$In_2O_3$
(13) PET/Al
(14) PET/$In_2O_3$—$SnO_2$

In the above example, x is a value between 1 and 2, and PET stands for polyethylene terephthalate.

In obtaining the laminate (a), laminating of the thin metallic layer and/or the thin metal oxide layer with or without the high-refractive thin film layer to the transparent substrate may be carried out by any known methods, such as vacuum deposition, cathode sputtering, plasma flaming, vapor phase plating, electroless plating, electroplating, chemical coating, etc. either singly or in combination.

When a titanium oxide or zirconium oxide layer is used as the high-refractive thin film layer, a method is industrially advantageously used which comprises wet-coating a solution of an alkyl titanate or zirconate such as tetrabutyl titanate or zirconate, evaporating the solvent from the resulting coating and hydrolyzing the coating. This method is economically advantageous, and also has an effect of increasing the adhesion of the resulting layer to other layers because the titanium or zirconium oxide layer contains a small amount of an organic compound. In this case, the properties of the laminate can be improved by treating the layer at higher temperatures and humidities (e.g., 80° C. and RH 100%). A similar effect can be obtained by performing this treatment after providing the protective layer.

When the titanium oxide layer is provided by the above method, a laminate (a') having the above superiority can be obtained. But depending upon the conditions under which it is used, its durability may sometimes be inferior to that of a laminate (a'') in which the titanium oxide layer is provided by a physical means, for example by sputtering. Even such a laminate (a') can lead to the laminated structure of this invention having very good durability irrespective of the means for forming titanium oxide. Accordingly, example of the structure of the laminate (a') in which the effect of the protective layer is better exhibited are shown below [Ti-$O_2$(TBT) denotes a titanium oxide layer based on the alkyl titanate].

(i) PET/$TiO_2$(TBT)/Ag/$TiO_2$(TBT)
(ii) PET/$TiO_2$(TBT)/an alloy of Ag and Au and/or Cu/$TiO_2$(TBT)
(iii) PET/Au/$TiO_2$(TBT)
(iv) PET/$TiO_2$(TBT)/Au/$TiO_2$(TBT)
(v) PET/Ag.Cu/$TiO_2$(TBT)

Similar structures obtained by using an alkyl zirconate can also be cited as preferred examples.

As stated above, in one embodiment of the invention, the urethan linkage existing in the interface between the laminate (a) and the protective layer (b) is derived from a urethan linkage-containing polymer existing between the two layers. This embodiment will now be described in detail.

Such a urethan linkage-containing polymer is generally formed by addition reaction between a difunctional or higher polyisocyanate and a difunctional or higher polyol. Preferably, the urethan linkage-containing polymer has a three-dimensional network structure. In this case, at least one of the polyisocyanates or polyols should be trifunctional or higher. Conveniently, the urethan linkage-containing polymer having a three-dimensional network structure is formed by reacting a polymer having a hydroxyl group in a side chain with a difunctional or higher polyisocyanate.

Preferably, this urethan linkage-containing polymer should not be dissolved by organic solvents used in coating the protective layer (b). The urethan linkage-containing polymer having a three-dimensional network structure mentioned above meets this requirement.

The polyisocyanate may be any of aliphatic, alicyclic or aromatic polyisocyanates. Specific examples include aliphatic polyisocyanates such as tetramethylene diisocyanate, hexamethylene diisocyanate, 2,2,4-trimethylhexamethylene diisocyanate and 2,4,4-trimethylhexamethylene diisocyanate; alicyclic polyisocyanates such as 1,3- or 1,4-cyclohexylene diisocyanate, 4-methyl-1,3-cyclohexylylene diisocyanate,

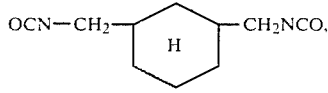

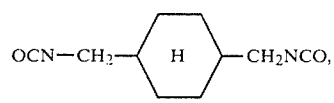

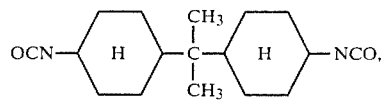

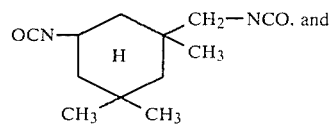

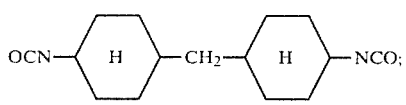

and aromatic diisocyanates such as m- or p-phenylenediisocyanate, tolylene diisocyanate, diphenylmethane diisocyanate, diphenylether diisocyanate and m- or p-xylene diisocyanate. Suitable trifunctional or higher polyisocyanates are those of the following formulae

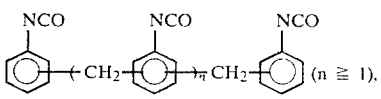

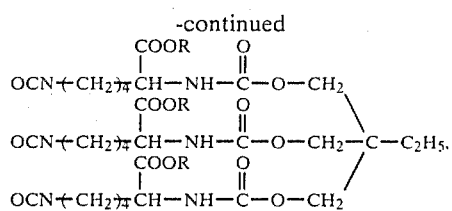

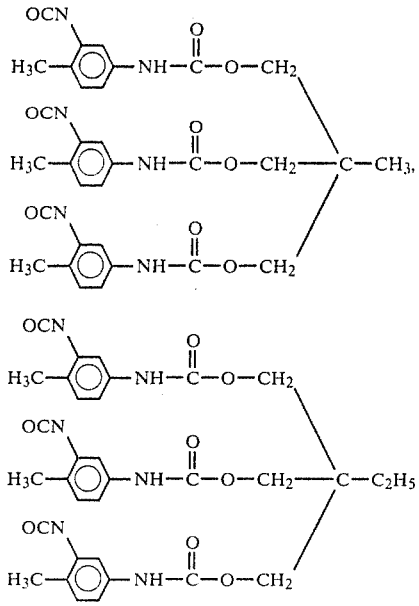

(to be abbreviated as triisocyanate T),

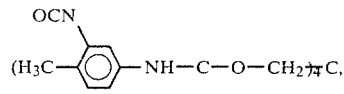

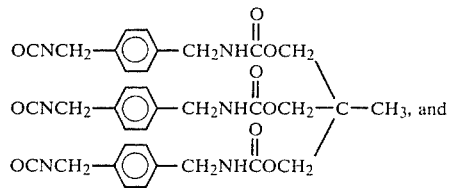

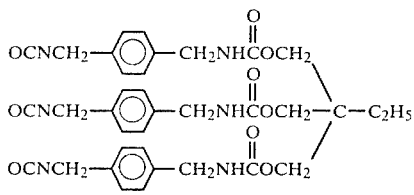

(to be abbreviated as triisocyanate M).

The polyisocyanates exemplified above may be used singly, or as a mixture of two or more.

Examples of suitable polyols are aliphatic or alicyclic polyols such as ethylene glycol, propylene glycol tetramethylene glycol, neopentylene glycol, cyclohexane dimethanol, xylylene glycol, trimethylolpropane, trimethylolethane, pentaetrythritol, and N-alkyl-substituted diethanol amines such as N-methyldiethanolamine and N-ethyldiethanolamine; triethanolamine, polyethylene glycol, polypropylene glycol and polytetramethylene glycol which have a hydroxyl group at both ends, or copolymers of these; aliphatic polyesters such as polyethylene adipate, polyethylene sebacate, polytetramethylene adipate and polytetramethylene sebacate which have a hydroxyl group at both ends, or copolymers of these; and polydienes having a hydroxyl group at both ends such as 1,2-polybutadienediol and 1,4-polybutadienediol.

Polymers or copolymers having a hydroxyl group in a side chain are especially preferably used. Examples of such polymers or copolymers include phenoxy resin, polyvinyl alcohol, polyvinylbutyral, hydroxyethyl cellulose and hydroxypropyl cellulose. There can also be conveniently used polymers or copolymers of acrylates or methacrylates having at least a hydroxyl group or acrylamides or methacrylamides having at least a hydroxyl group, such as 2-hydroxyethyl acrylate, 2-hydroxyethyl methacrylate, 2-hydroxyethyl methacrylate, 2-hydroxypropyl acrylate, 2-hydroxypropyl methacrylate,

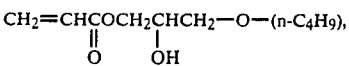

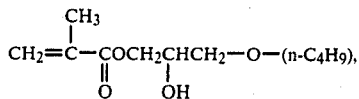

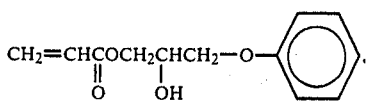

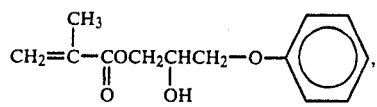

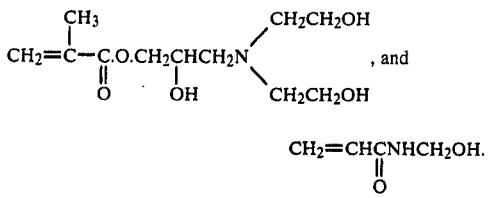

As comonomers for the copolymers, there may conveniently be used styrene, α-methylstyrene, acrylic or methacrylic acid, methyl acrylate or methacrylate, ethyl acrylate or methacrylate, 2-ethylhexyl acrylate or methacrylate, butoxyethyl acrylate or methacrylate, vinyl acetate, acrylamide, methacrylamide, acrylonitrile, and methacrylonitrile. In the case of the copolymers, the hydroxyl-containing acrylate or methacrylate or acrylamide or methacrylamide is used in an amount of at least 2 mole%, preferably at least 5 mole%.

The polymers or copolymers may be produced by radical polymerization, anionic polymerization, etc. in accordance with a bulk, solution, suspension or emulsion polymerization method.

The proportion of the urethan linkage in the urethan linkage-containing polymer is usually 0.1 to 5 millimoles/g, preferably 0.2 to 3 millimoles/g, as the equivalent weight of the urethan linkage per gram of the polyurethan resin.

When the urethan linkage is derived from the urethan linkage-containing polymer existing between the laminate (a) and the protective layer (b), the protective layer (b) is composed of a polymer having structural units of the general formula

wherein R is a hydrogen atom or a methyl group as main structural units.

In this case, the protective layer (b) preferably has no urethan linkage and is composed of the structural units of formula (I) alone in order not to degrade selective light-transmittability.

The protective layer (b) may include another type of structural units in amounts which do not impair the characteristics of the protective layer. Examples of such other structural units are those composed of vinyl monomers copolymerizable with acrylonitrile or methacrylonitrile. More specifically, they include styrene-type monomers such as styrene or α-methylstyrene; acrylic or methacrylic monomers such as acrylic or methacrylic acid, methyl acrylate or methacrylate, ethyl acrylate or methacrylate, butyl acrylate or methacrylate, 2-ethylhexyl acrylate or methacrylate, 2-hydroxyethyl acrylate or methacrylate, 2-hydroxypropyl acrylate or methacrylate, methoxyethyl acrylate or methacrylate, ethoxyethyl acrylate or methacrylate, n-butoxyethyl acrylate or methacrylate, glycidyl acrylate or methacrylate, or adducts of glycidyl acrylate or methacrylate with n-butanol, phenol or diethanolamine; acrylamide or methacrylamide monomers such as acrylamide, methacrylamide, N-methylol acrylamide, and diacetone acrylamide; and vinyl acetate. These comonomers may be used singly or in combination of two or more.

The polymer may be obtained by radical polymerization or anionic polymerization in accordance with a bulk, solution, suspension or emulsion polymerization method. The above polymers have molecular weight expressed by an intrinsic viscosity, measured in dimethyl formamide at 30° C., of 0.5 to 15.0 dl/g, preferably 0.7 to 10.0 dl/g. If the intrinsic viscosity of the polymers is less than the lower limit specified above, the scratch resistance of the polymer is reduced. If the intrinsic viscosity is above the upper limit specified above, there is no appreciable increase in improvement in scratch resistance incident to an increase in molecular weight. Furthermore, the viscosity of the coating composition increases to degrade its coatability.

The total thickness of the protective layer (b) and the urethan linkage-containing polymer layer is above the upper limit of the interference film thickness but does not exceed 20 microns; preferably it is above the upper limit of the interference film thickness and up to 10 microns. The interference film thickness means the thickness of the film in which upon the irradiation of visible light, a rainbow-colored interference fringe occurs. It is usually 0.3 μm to 1.5 μm although it varies depending upon the index of refraction, etc., and cannot be generalized. The lower limit of the thickness of the protective layer in this invention is determined according to the material used. For the above reason, however, the lower limit of the film thickness should usually be 1.5 μm. Thicknesses exceeding 20 μm are undesirable because the ratio of infrared absorption increases.

The urethan linkage-containing polymer layer as a first layer shows a stronger absorption in the infrared region based on the urethan linkage than the (meth)acrylonitrile layer as a second layer. Hence, increasing film thicknesses result in a reduction in the ability to reflect heat waves. Accordingly, the thickness of the first layer should be limited to the minimum thickness which is required to impart adhesion between the selective light-transmitting first layer and the protective second layer. Usually, the thickness of the first layer is 0.01 micron to 1.0 micron, preferably, 0.05 to 0.7 micron, more preferably 0.1 to 0.4 micron. Thicknesses above the upper limit are undesirable because there will be a reduction in the ability to reflect heat waves. Thicknesses below the lower limit are undesirable because they cannot contribute to spotting resistance.

The laminated structure of the invention having the urethan linkage-containing polymer as a first layer and the protective layer as a second layer is produced by first providing the urethan linkage-containing polymer layer and then forming the protective layer composed of a polymer having the structural units of general formula (I) as main structural units on the first layer.

The first layer is formed usually by applying a solution containing raw materials for the crosslinked polymer by a general method such as dip coating, spraying, a spinner method, or a gravure coating method and then subjecting the resulting layer to crosslinking reaction.

The first layer becomes a polymeric layer as a result of the urethan formation reaction of the polyol with the polyisocyanate after the coating. The solvent used to form the coating solution must be inert to the isocyanate and can dissolve the polyol and polyisocyanate and be removed by evaporation. Examples include polar solvents such as dimethyl formamide, dimethyl acetamide, N-methylpyrrolidone, tetramethylurea, dimethyl sulfoxide and tetramethylenesulfone; ketones such as cyclohexanone, methyl ethyl ketone, methyl isobutyl ketone and acetone; esters such as ethyl acetate, butyl acetate and isobutyl acetate; and other solvents such as ethyl acetoacetate, methyl acetoacetate and acetylacetone.

In order to remove the solvent sufficiently and carry out the urethan formation reaction sufficiently, the drying of the coated layer is carried out generally at 70° C. or higher, preferably 100° C. or higher. The upper limit of the drying temperature depends upon the heat resistance of the substrate and the drying time, but a temperature of 200° C. suffices.

To promote the urethan formation, a urethan formation catalyst such as a tertiary amine (e.g., triethylene diamine or tri-n-butylamide), or dibutyltin dilaurate may be used in combination.

After the coating, the protective layer as a second layer does not need to be chemically reacted. It can be easily obtained by coating a solution containing the aforesaid polymer and then drying the coated layer in a similar manner to that in the formation of the first layer.

Additives such as ultraviolet absorbers or another polymer may be used in addition to the aforesaid polymer in amounts which do not impair the selective light-transmittability and abrasion resistance of the laminated structure of this invention.

The invention will now be described with regard to an embodiment in which the urethan linkage existing in the interface between the laminate (a) and the protective layer (b) is bonded to the polymer constituting the protective layer (b). Preferably, the protective layer (b) in this embodiment is composed of a crosslinked urethane polymeric compound formed by reacting a hydroxyl-containing copolymer composed mainly of structural units of the formula

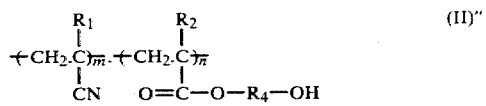

wherein $R_1$ and $R_2$, independently from each other, represent a hydrogen atom or a methyl group, $R_4$ represents a hydrocarbon group having not more than 10 carbon atoms which may contain an oxygen or nitrogen atom, provided that the oxygen atom may exist as an ether linkage or a hydroxyl group, and the nitrogen atom may exist as a tertiary amino linkage, and m and n are integers, more preferably a hydroxyl-containing copolymer composed mainly of structural units of the formula

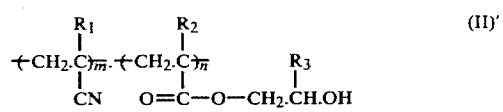

wherein $R_1$, $R_2$, $R_3$, m and n are as defined hereinabove, with a polyisocyanate, whereby at least one of hydroxyl groups of the hydroxyl-containing copolymer reacts to form a urethan crosslinkage.

Such a crosslinked urethan polymeric compound is obtained by crosslinking with a polyisocyanate a copolymer composed mainly of structural units of the formula

wherein $R_1$ is a hydrogen atom or a methyl group, and structural units of the formula

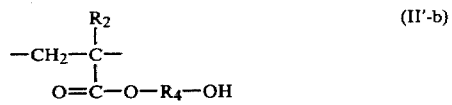

wherein $R_2$ is a hydrogen atom or a methyl group, and $R_4$ is a hydrocarbon group having not more than 10 carbon atoms which may have an oxygen or nitrogen atom, provided that the oxygen atom may exist as an ether linkage or a hydroxyl group, and the nitrogen atom may exist as a tertiary amino linkage, preferably structural units of the following formula

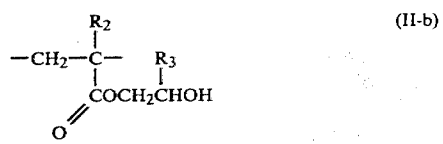

wherein $R_2$ represents a hydrogen atom or a methyl group, and $R_3$ represents a hydrogen atom, a group of the formula —$CH_2$—$OR_7$ in which $R_7$ represents an alkyl group having 1 to 6 carbon atoms or a phenyl group, or a group of the formula

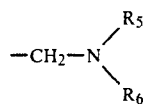

in which $R_5$ and $R_6$ are identical or different and each represents an alkyl group having 1 to 6 carbon atoms, a 2-hydroxyethyl group, or a 2-hydroxypropyl group.

$R_1$ and $R_2$ may be identical or different throughout the entire polymer. Examples of the alkyl group for $R_4$, $R_5$ and $R_6$ are methyl, ethyl, propyl, isopropyl, n-butyl, isobutyl, sec-butyl, n-amyl and isoamyl groups.

The ratio of the structural units of formula (II-a) to the structural units of formula (II-b) is from 70:30 to 99.5:0.5, preferably from 75:25 to 99:1, especially preferably from 80:20 to 98:2. Accordingly, the m and n in formula (II) correspond to the above mole ratios. If the proportion of the structural units (II-b) exceeds the aforesaid limit, light absorption in the infrared region based on an ester linkage, a urethane linkage and a hydroxyl group is strong and the ability to reflect infrared light is reduced. If the proportion of the structural units (II-b) is too small, the crosslinking effect is not produced.

The copolymer composed of the structural units of formulae (II-a) and (II-b) is formed by copolymerizing acrylonitrile or methacrylonitrile of the formula

wherein $R_1$ is as defined, with a hydroxyethyl acrylate or methacrylate of the following formula

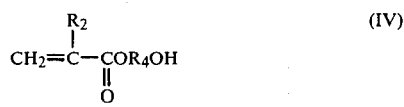

wherein $R_2$ and $R_4$ are as defined hereinabove. But it is not limited to this process alone. For example, when $R_4$ is $-CH_2.CHR_3-$ and $R_3$ is $-CH_2OR_7$ (wherein $R_7$ is as defined above) or

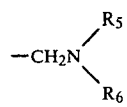

(wherein $R_5$ and $R_6$ are as defined above), a glycidyl acrylate or methacrylate of the following formula

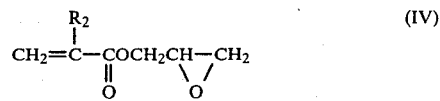

wherein $R_2$ is as defined above, may be used instead of the hydroxyethyl acrylate or methacrylate and copolymerized with the (meth)acrylonitrile, followed by addition reaction with an alcohol or phenol of formula $R_7OH$ or an amine of the formula

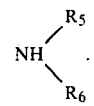

The type of the polymerization may be radical polymerization or anionic polymerization, and a bulk, solution, suspension or emulsion polymerization method may, for example, be used. The polymer obtained has a molecular weight expressed by an intrinsic viscosity, measured in dimethyl formamide at 30° C., of 0.5 to 15.0 dl/g, preferably 0.7 to 10.0 dl/g. If the intrinsic viscosity of the polymer is below the specified limit, the scratch resistance of the resulting protective layer is degraded. If the molecular weight increases beyond the specified upper limit, there is no appreciable increase in scratch resistance, and moreover, the viscosity of the coating solution becomes high to degrade its coatability.

The polymer may contain other structural units in proportions which do not impair the characteristics of the protective layer. For example, such other structural units are composed of a vinyl monomer capable of being copolymerized with (meth)acrylonitrile. Examples include styrene monomers such as styrene and α-methylstyrene; acrylic or methacrylic monomers such as acrylic or methacrylic acid, methyl acrylate or methacrylate, ethyl acrylate or methacrylate, butyl acrylate or methacrylate, 2-ethylhexyl acrylate or methacrylate, 2-hydroxyethyl acrylate or methacrylate, 2-hydroxypropyl acrylate or methacrylate, methoxyethyl acrylate or methacrylate, ethoxyethyl acrylate or methacrylate, and n-butoxyethyl acrylate or methacrylate; acrylamide or methacrylamide type monomers such as acrylamide, methacrylamide, N-methylol acrylamide and diacetone acrylamide; and vinyl acetate. Suh vinyl monomers may be used singly or in combination.

The polyisocyanate used may be the same as those exemplified hereinabove.

The proportion of the crosslinkage of the protective layer (b) having a urethan crosslinkage is usually 0.01 to 1.0 millimole, preferably 0.02 to 0.8 millimole, especially preferably 0.05 to 0.6 millimole, as the equivalence of the urethan linkage per gram of the protective layer.

The thickness of the protective layer is above the upper limit of the interference film thickness (as defined hereinabove) and up to 20 microns, preferably above the upper limit of the interference film thickness and up to 10 microns.

In order to form the protective layer (b) having a urethan crosslinkage on the surface of the laminate (a), it is the usual practice to coat a solution containing the hydroxyl-containing copolymer and the polyisocyanate by a general method such as dip-coating, spray coating, a spinner method, or a gravure coating method, and to react the resulting layer.

Specifically, the protective layer is obtained by performing the urethan formation reaction of at least a part of the hydroxyl groups in the copolymer with the polyisocyanate after the coating, thereby forming a three-dimensional network structure. The solvent used for this purpose should be inert to the polyisocyanate, be able to dissolve the copolymer and the polyisocyanate and be removable by evaporation. Examples of the solvent are polar solvents such as dimethyl formamide, dimethyl acetamide, N-methylpyrolidone, tetramethylurea, dimethyl sulfoxide and tetramethylene sulfone; ketones such as cyclohexanone, methyl ethyl ketone, methyl isobutyl ketone and acetone; esters such as ethyl acetate, butyl acetate and isobutyl acetate; and other solvents such as ethyl acetoacetate, methyl acetoacetate and acetylacetone. In order to evaporate off the solvent fully, and to perform the urethan formation reaction fully, the drying of the coating is carried out generally at a temperature of at least 70° C., preferably at least 100° C. The upper limit of the drying temperature varies depending upon the heat resistance of the substrate and the drying time, but a temperature of 200° C. is usually sufficient. In order to promote the urethan formation reaction, a urethan formation reaction catalyst, such as a tertiary amine (e.g., triethylenediamine or tri-n-butylamine) or dibutyltin dilaurate may be used together.

In addition to the raw materials for the crosslinked polymer, additives such as ultraviolet absorbers and other polymers may be used together in amounts which do not impair the selective light-transmittability and abrasion resistance of the laminated structure of this invention.

The laminated structure of this invention so obtained is useful as a transparent thermally insulating windowpane for utilization of solar energy or prevention of energy dissipation. It is especially useful as a double window in buildings and vehicles. The laminated structure of the invention can find other applications by utilizing its transparency and electric conductivity, for example as electrodes for liquid crystal display, electrodes for field luminescent bodies, electrodes for photoconductive light-sensitive materials, antistatic layers, panel heaters, and other electronics applications.

The following examples illustrate the present invention more specifically.

In the following examples, all light transmittances are values measured at a wavelength of 500 nm unless otherwise indicated.

The infrared reflectance was measured by mounting a reflectance measuring device to an infrared spectrometer (model EPI-II of Hitachi Limited). The reflectance of a slide glass having a layer of silver (about 3000 Å) formed thereon by vacuum deposition was taken as 100%.

The chemical composition of the thin metallic layer was determined by a fluorescent X-ray analyzing method using a fluorescent X-ray analysis device made by Rigaku Denki K.K.

The clockmeter test was performed by using a clockmeter made by Toyo Seiki K.K. The surface of a sample under a load of 500 g/cm² was rubbed with a commercial gauze by moving it reciprocally. The number of reciprocations effected until wear of the metallic layer occurred was measured.

The film thickness was measured by a digital electronic micrometer (model K551A made by Anritsu Denki K.K.).

The average infrared reflectance was calculated as follows:

A protective layer (having a thickness of 2 microns unless otherwise specified) was formed on a selective light-transmitting laminate composed of a thin metallic layer and a thin film layer having a high refractive index to produce a laminated structure as a sample. The infrared reflectance of the sample was measured by an infrared spectroscopic method in a wavelength region of 3 to 25 microns. On the other hand, energy radiated from a black body at 300° K. (27° C.) was picked up at 0.2 μm wavelength intervals, and the product of the infrared reflectance measured by infrared spectroscopy and the radiant energy corresponding to each wavelength was calculated for each 0.2 μm. The total of the products within the wavelength region of 3 to 25 μm was calculated. The total was then divided by the total of the radiant energy intensities within the range of 3 to 25 μm. The quotient obtained represents the percentage of the energy (3 to 25 μm region) radiated from the 300° K. black body which the sample reflected. This is defined as the infrared reflectance (I-value). The radiant energy in the 3–25 μm region corresponds to about 85% of the total energy radiated from the black body at 300° K.

The corrosion resistance was measured as follows: A salt spray tester (a product made by Gas Tester K.K.) was used, and the laminated structure was put into a chamber kept at 35° C. Salt water (concentration 5%) was sprayed onto the laminated structure. The sample was observed every 24 hours, and the corrosion resistance of the sample was defined as the number of days which elapsed until at least five spots formed in an area of $5 \times 5$ cm² in the sample.

The light resistance was measured by an ultraviolet carbon arc lamp-type light resistance tester (Glass Enclosed Carbon-Arc Type Apparatus for Artificial Light Exposure Tests, JIS B7751) in such a manner that the light which was transmitted through the glass plate fell directly upon the protective layer.

All parts and percentages in these Examples are by weight unless otherwise indicated.

EXAMPLE 1

Onto a biaxially stretched polyethylene terephthalate film having a light transmittance of 86% at 500 nm and a thickness of 50 μm were successively laminated a titanium oxide layer having a thickness of 300 Å, a silver-copper alloy layer having a thickness of 195 Å (silver 92%, copper 8%) and a titanium oxide layer having a thickness of 280 Å in this order to form a laminate (a-1) having selective light-transmittability.

Each of the titanium oxide layers was formed by coating a solution consisting of 3 parts of tetrabutyl titanate tetramer and 97 parts of isopropyl alcohol by means of a bar coater and heat-treating the coating at 120° C. for 3 minutes.

The silver-copper alloy layer was formed by vacuum deposition of an alloy consisting of 70% of silver and 30% of copper in accordance with a resistance heating method.

A coating solution consisting of 10 parts of a methacrylonitrile/2-hydroxyethyl methacrylate (90:10 by weight) copolymer ($\eta_{sp/c}$ = 1.58 dl/g measured at 30° C. in a dimethyl formamide solution with c = 0.5 g/dl), 4 parts of triisocyanate T, 160 parts of cyclohexanone and 160 parts of methyl ethyl ketone was coated on the resulting laminate (a-1) by means of a bar coater No. 10, and dried at 130° C. for 3 minutes to form a first layer having a thickness of 0.3 micron. Then, a coating solution consisting of 10 parts of polymethacrylonitrile ($\eta_{sp/c}$ = 1.0 dl/g, measured at 30° C. in a dimethyl formamide solution with c = 0.5 g/dl), 45 parts of methyl ethyl ketone and 45 parts of cyclohexanone was coated on the first layer by means of a bar coater No. 16 and dried at 130° C. for 3 minutes to form a transparent protective layer having a thickness of 2.0 μm. Thus, a laminated structure (1) was obtained.

The laminated structure (1) had an infrared reflectance (I-value) of 86% and a visible light transmittance of 59%. In the clockmeter test, it showed an abrasion resistance of more than 3000 cycles, and in the salt spray test, spots occurred 25 days later.

COMPARATIVE EXAMPLE 1

A coating solution consisting of 10 parts of polymethacrylonitrile ($\eta_{sp/c}=1.0$ measured at 30° C. in a 0.5% dimethyl formamide solution), 45 parts of methyl ethyl ketone and 45 parts of cyclohexanone was coated on the laminate (a-1) obtained in Example 1 by means of a bar coater No. 16 in the same way as in Example 1 to form a laminated structure (2) having a transparent protective layer with a thickness of 2.0 μm.

The laminated structure (2) had an infrared reflectance (I-value) of 86%, a visible light transmittance of 57% and a scratch resistance of more than 2500 cycles. In the salt spray test, spots occurred after the lapse of one day.

EXAMPLE 2

A titanium oxide layer having a thickness of 150 Å, a silver layer having a thickness of 190 Å and a titanium oxide layer having a thickness of 250 Å were laminated successively in this order onto a biaxially stretched polyethylene terephthalate film having a light transmittance of 86% at 500 nm and a thickness of 25 μm in this order to form a selective light-transmitting laminate (a-2).

The silver layer was formed by DC sputtering using a silver as a target.

Each of the titanium layer oxide layers was formed by reactive sputtering of titanium.

A coating solution consisting of 10 parts of 2-hydroxyethyl methacrylate polymer ($\eta_{sp/c}=0.65$ dl/g, measured at 30° C. in a dimethyl formamide solution with c=0.58/dl) and 2 parts of triisocyanate T by means of a bar coater No. 10, and dried at 130° C. for 3 minutes to form a first layer having a film thickness of 0.2 micron. Then, a coating solution consisting of 10 parts of polymethacrylonitrile, 45 parts of methyl ethyl ketone and 45 parts of cyclohexanone, the same as that used in Example 1, was coated on the first layer by means of a bar coater No. 16, and dried at 130° C. for 3 minutes to obtain a laminated structure (3) having a transparent protective layer with a thickness of 2.0 μm.

The laminated structure (3) had an infrared reflectance (I-value) of 86% and a visible light transmittance of 59%.

In the clockmeter test, the laminated structure (3) had an abrasion resistance of more than 3000 cycles, and gave rise to no problem in practical application.

In the salt spray test, spots occurred 25 days later. Thus, the laminated structure (3) had markedly improved spotting resistance.

COMPARATIVE EXAMPLE 2

Polymethacrylonitrile was coated on the laminate (a-2) under the same conditions as in Comparative Example 1 to form a laminated structure (4) having a transparent protective layer with a thickness of 2 μm.

The laminated structure (4) had an infrared reflectance (I-value) of 82% and a visible light transmittance of 63%. In the salt spray test, spots occurred after the lapse of one day.

EXAMPLE 3

A titanium oxide layer having a thickness of 150 Å, a gold layer having a thickness of 90 Å and a titanium oxide layer having a thickness of 250 Å were successively laminated in this order to a biaxially stretched polyethylene terephthalate film having a light transmittance of 86% and a thickness of 25 μm to form a selective light-transmitting laminate (a-3).

The titanium oxide layers were formed by reactive sputtering of titanium, and the gold layer was formed by an ordinary sputtering method.

A coating solution consisting of 10 parts of a 2-hydroxyethyl methacrylate/methyl methacrylate (30:70 by weight) copolymer ($\eta_{sp/c}=0.53$ dl/g, measured at 30° C. in a dimethyl formamide solution with c=0.5 g/dl) and 4 parts of triisocyanate T was coated on the laminate (a-3) by means of a bar coater No. 10 and dried at 130° C. for 3 minutes to form a first layer having a thickness of 0.3 micron. Then, a coating solution consisting of 10 parts of polymethacrylonitrile, 45 parts of methyl ethyl ketone and 45 parts of cyclohexanone, the same as that used in Example 1, was coated on the first layer by means of a bar coater No. 16, and dried at 130° C. for 3 minutes to form a laminated structure (5) having a transparent protective layer with a thickness of 2.0 μm.

The laminated structure (5) had an infrared reflectance (I-value) of 75% and a visible light transmittance of 70%. In the clockmeter test, the abrasion resistance of the laminated structure (5) was more than 3000 cycles, and no problem arose in practical application. In the salt spray test, spots did not occur even after the lapse of 30 days.

COMPARATIVE EXAMPLE 3

A protective layer with a thickness of 2 μm of polymethacrylonitrile was formed on the laminate (a-3) under the same conditions as in Comparative Example 1. In the salt spray test, a part of the resulting laminated structure turned reddish violet after the lapse of 30 days.

EXAMPLE 4

A titanium oxide layer having a thickness of 150 Å, a titanium oxide layer having a thickness of 20 Å and being in the low oxidation state, a silver-copper alloy layer having a thickness of 160 Å (Ag:Cu=90:10 by weight), a titanium oxide layer having a thickness of 30 Å and being in the low oxidation state, and a titanium oxide layer having a thickness of 250 Å were successively laminated in this order onto a biaxially stretched polyethylene terephthalate film having a light transmittance of 86% and a thickness of 25 μm to obtain a selective light-transmitting laminate (a-4).

The titanium oxide layers were formed by hydrolysis of tetrabutyl titanate as in Example 1, and the alloy layer was formed by a sputtering method.

A coating solution consisting of 10 parts of a

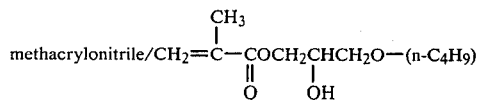

(90:10 by weight) copolymer ($\eta_{sp/c}=1.83$, measured at 30° C. in a dimethyl formamide solution with c=0.5 g/dl) and 4 parts of triisocyanate T was coated on the laminate (a-4) by means of a bar coater No. 10, and dried at 130° C. for 3 minutes to form a first layer having a thickness of 0.3 micron. Then, a coating solution consisting of 10 parts of polymethacrylonitrile, 50 parts of methyl ethyl ketone and 40 parts of cyclohexanone, the same as that used in Example 1, was coated on the first layer by means of a bar coater No. 16, and dried at 130° C. for 3 minutes to form a laminated structure (6) having a transparent protective layer with a thickness of 2.0 μm.

The laminated structure (6) had an infrared reflectance (I-value) of 79% and a visible light transmittance of 65%. In the salt spray test, spots occurred after the lapse of 25 days.

EXAMPLE 5

A coating solution consisting of 10 parts of a

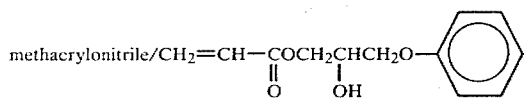

(90:10 by weight) copolymer ($\eta_{sp/c}=1.25$ dl/g, measured at 30° C. in a dimethyl formamide solution with c=0.58/dl) and 4 parts of triisocyanate T was coated on the laminate (a-1) obtained in Example 1 by means of a bar coater No. 10 and dried at 130° C. for 3 minutes to form a first layer having a thickness of 0.3 micron. Then, a coating solution consisting of 10 parts of a methacrylonitrile/n-butoxyethyl methacrylate (90:10 by weight) copolymer ($\eta_{sp/c}=1.84$ dl/g, measured at 30° C. in a dimethyl formamide solution with c=0.5 g/dl), 45 parts of methyl ethyl ketone and 45 parts of cyclohexanone was coated on the first layer by means of a bar coater No. 16, and dried at 130° C. for 3 minutes to form a laminated structure (7) having a transparent protective layer with a thickness of 2.0 μm.

The laminated structure (7) had a visible light transmittance of 55% and an infrared reflectance (I-value) of 82%. In the clockmeter test, the laminated structure (7) showed an abrasion resistance of more than 3000 cycles, and in the salt spray test, spots occurred after the lapse of 35 days.

EXAMPLE 6

A coating solution consisting of 10 parts of polybutadiene diol (Nisso PB-G1000, a tradename for a product of Nippon Soda Co., Ltd.), 1 part of triisocyanate T and 90 parts of toluene was coated on the laminate (a-2) used in Example 2 by means of a bar coater No. 10, and dried at 130° C. for 3 minutes to form a first layer having a thickness of 0.3 micron. Then, a coating solution consisting of 10 parts of polyacrylonitrile ($\eta_{sp/c}=1.95$, measured at 30° C. in a dimethyl formamide solution with c=0.5 g/dl) and 90 parts of dimethyl formamide was coated on the first layer by means of a bar coater No. 16, and dried at 180° C. for 3 minutes to form a laminated structure (8) having a transparent protective layer with a thickness of 2.0 μm.

The laminated structure (8) had an infrared reflectance (I-value) of 85% and a visible light transmittance of 64%. In the clockmeter test, the laminated structure (8) showed an abrasion resistance of more than 3800 cycles, and no problem arose in practical application. In the salt spray test, spots occurred after the lapse of 26 days, showing a marked improvement in spotting resistance.

EXAMPLE 7

A coating solution consisting of 10 parts of a phenoxy resin, 2.0 parts of m-xylylene diisocyanate, 45 parts of methyl ethyl ketone and 45 parts of cyclohexanone was coated on the laminate (a-3) used in Example 3 and dried at 130° C. for 3 minutes to form a first layer having a thickness of 0.3 μm. Then, a coating solution consisting of 10 parts of polymethacrylonitrile, 45 parts of methyl ethyl ketone and 45 parts of cyclohexanone, the same as that used in Example 1, was coated on the first layer by means of a bar coater No. 16 and dried at 130° C. for 3 minutes to form a laminated structure (9) having a transparent protective layer with a thickness of 2.0 μm.

The laminated structure (9) had an infrared reflectance of 73% and a visible light transmittance of 70%. In the clockmeter test, the laminated structure (9) showed an abrasion resistance of more than 2500 cycles, and no problem arose in practical application. In the salt spray test, spots did not form even after the lapse of 25 days.

EXAMPLE 8

A coating solution consisting of 5 parts of polyethylene glycol (average molecular weight 500), 5 parts of glycerol, 0.5 part of diphenylmethane diisocyanate and 50 parts of dimethyl formamide was coated on the laminate (a-1) used in Example 1 by means of a bar coater No. 10, and dried at 150° C. for 3 minutes to form a first layer having a thickness of 0.4 micron. Then, a coating solution consisting of 10 parts of polymethacrylonitrile, 45 parts of methyl ethyl ketone and 45 parts of cyclohexanone, the same as that obtained in Example 1, was coated on the first layer by means of a bar coater No. 16, and dried at 130° C. for 3 minutes to form a laminated structure having a transparent protective layer with a thickness of 2.5 μm.

The laminated structure had an infrared reflectance (I-value) of 81% and a visible light transmittance of 59%. In the clockmeter test, the laminated structure showed an abrasion resistance of more than 2600 cycles, and no problem arose in practical application. In the salt spray test, spots did not form even after the lapse of 20 days.

EXAMPLE 9

A coating solution consisting of 10 parts of a methyl methacrylate/

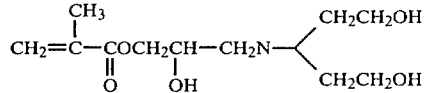

copolymer (70:30 by weight; $\eta_{sp/c}=0.65$ dl/g, measured at 30° C. in a dimethyl formamide solution with c=0.5 g/dl), 0.5 part of isophorone diisocyanate, 45 parts of methyl ethyl ketone and 45 parts of cyclohexanone was coated on the laminate (a-1) used in Example 1 by means of a bar coater No. 10 and dried at 140° C. for 3 minutes to form a first layer having a thickness of 0.4 micron. Then, a solution consisting of 10 parts of a methacrylonitrile/n-butoxyethyl methacrylate copolymer, 45 parts of methyl ethyl ketone and 45 parts of cyclohexanone, the same as that used in Example 5, was coated on the first layer by means of a bar coater No. 16, and dried at 130° C. for 3 minutes to form a laminated structure having a transparent protective layer with a thickness of 2.0 μm.

The laminated structure had an infrared reflectance (I-value) of 86% and a visible light transmittance of 59%. In the clockmeter test, the laminated structure showed an abrasion resistance of more than 2500 cycles, and no problem arose in practical application. In the salt spray test, spots did not form even after the lapse of 60 days.

EXAMPLE 10

A coating solution consisting of 10 parts of polyethylene adipate having a hydroxyl group at both ends (average molecular weight 1200), 1.5 parts of triisocyanate T and 100 parts of toluene was coated on the laminate (a-1) used in Example 1 by means of a bar coater No. 10, and dried at 130° C. for 3 minutes to form a first layer having a thickness of 0.3 micron. Then, a solution consisting of 10 parts of polymethacrylonitrile, 45 parts of cyclohexanone and 45 parts of methyl ethyl ketone, the same as that used in Example 1, was coated on the first layer and dried at 125° C. for 3 minutes to form a laminated structure having a transparent protective layer with a thickness of 2.0 μm.

The laminated structure had an infrared reflectance (I-value) of 86% and a visible light transmittance of 58%. In the clockmeter test, the laminated structure showed an abrasion resistance of more than 2500 cycles, and no problem arose in practical application. In the salt spray test, spots did not form even after the lapse of 25 days.

EXAMPLE 11

A solution consisting of 3 parts of phenoxy resin, 1.2 parts of triisocyanate T and 100 parts of cyclohexanone was coated on the laminate (a-2) used in Example 2 by means of a bar coater No. 3, and dried at 130° C. for 3 minutes to form a first layer having a thickness of 0.3 micron. A coating solution consisting of 10 parts of a methacrylonitrile/n-butoxyethyl methacrylate copolymer, 45 parts of methyl ethyl ketone and 45 parts of cyclohexanone, the same as that used in Example 5, was coated on the first layer by means of a bar coater No. 16, and dried at 130° C. for 3 minutes to form a laminated structure having a transparent protective layer with a thickness of 2.0 μm.

The laminated structure had an infrared reflectance (I-value) of 82% and a visible light transmittance of 68%. In the clockmeter test, the laminated structure showed an abrasion resistance of more than 2500 cycles, and no problem arose in practical application. In the salt spray test, spots did not form even after the lapse of 53 days.

EXAMPLE 12

A coating solution consisting of 10 parts of polyvinylbutyral resin (a product of Denki Kagaku Kogyo K.K.), 5 parts of 1,3-cyclohexanedimethylene diisocyanate and 200 parts of Cellosolve acetate was coated on the laminate (a-2) used in Example 2, by means of a bar coater No. 5, and dried at 130° C. for 3 minutes to form a first layer having a thickness of 0.4 micron. Then, a coating solution consisting of 10 parts of polymethacrylonitrile, 45 parts of methyl ethyl ketone and 45 parts of cyclohexanone, the same as that used in Example 1, was coated on the first layer by means of a bar coater No. 16, and dried at 130° C. for 3 minutes to form a laminated structure having a transparent protective layer with a thickness of 2.5 μm.

The laminated structure had an infrared reflectance (I-value) of 82% and a visible light transmittance of 67%. In the clockmeter test, the laminated structure showed an abrasion resistance of more than 2500 cycles, and no problem arose in practical application. In the salt spray test, spots did not form even after the lapse of 25 days.

EXAMPLE 13

A zirconium oxide layer having a thickness of 10 Å, a silver-copper alloy layer having a thickness of 120 Å (Cu 11%), and a zirconium oxide layer having a thickness of 200 Å were successively laminated in this order to a biaxially stretched polyethylene terephthalate film having a thickness of 50 μm to form a selective light-transmitting laminate (a-5).

The zirconium oxide layers were formed by hydrolysis of tetrabutyl zirconate.

A coating solution consisting of 10 parts of poly(2-hydroxyethyl methacrylate) ($\eta_{sp/c}=0.65$ dl/g, measured at 30° C. in a dimethyl formamide solution with c=0.5 g/dl) and 2 parts of triisocyanate M was coated on the laminate (a-5) by means of a bar coater No. 10, and dried at 130° C. for 3 minutes to form a first layer having a thickness of 0.3 μm. Then, a coating solution consisting of 10 parts of polymethacrylonitrile, 45 parts of methyl ethyl ketone and 45 parts of cyclohexanone, the same as that used in Example 1, was coated on the first layer by means of a bar coater No. 16, and dried at 130° C. for 3 minutes to form a laminated structure having a transparent protective layer with a thickness of 3.0 μm.

The laminated structure had an infrared reflectance (I-value) of 78% and a visible light transmittance of 62%. In the clockmeter test, the laminated structure showed an abrasion resistance of more than 3000 cycles, and no problem arose in practical application.

In the light resistance test, no change in appearance was noted even after exposure for 2000 hours, and the laminated structure retained its ability to reflect heat waves. In the salt spray test, spots did not form even after the lapse of 35 days.

EXAMPLE 14

An aluminum layer having a thickness of 100 Å was formed on a biaxially stretched polyethylene terephthalate film having a light transmittance of 86% at 500 nm and a thickness of 50 μm to form a laminate (a-6) having selective light transmittability. The aluminum layer was formed by vacuum deposition in accordance with a resistance heating method.

A coating solution consisting of 10 parts of a methacrylonitrile/2-hydroxyethylmethacrylate (90:10 by weight) copolymer ($\eta_{sp/c}=1.58$ dl/g, measured at 30° C. in a dimethyl formamide solution with c=0.5 g/dl), 4 parts of triisocyanate T, 160 parts of cyclohexanone and 160 parts of methyl ethyl ketone was coated on the resulting laminate (a-6) by means of a bar coater No. 10, and dried at 150° C. for 3 minutes to form a first layer having a thickness of 0.3 micron. Then, a coating solution consisting of 10 parts of polymethacrylonitrile ($\eta_{sp/c}=1.0$ dl/g, measured at 30° C. in a dimethyl formamide solution with c=0.5 g/dl), 45 parts of methyl ethyl ketone and 45 parts of cyclohexanone was coated on the first layer by means of a bar coater No. 16, and dried at 130° C. for 3 minutes to form a laminated structure having a transparent protective layer with a thickness of 2.5 μm.

In the clockmeter test, the laminated structure showed an abrasion resistance of more than 3000 cycles, and in the salt spray test, spots occurred after the lapse of 33 days.

COMPARATIVE EXAMPLE 4

A coating solution consisting of 10 parts of polymethacrylonitrile ($\eta_{sp/c}=1.0$ dl/g, measured at 30° C. in a dimethyl formamide solution in a concentration of 0.5%), 45 parts of methyl ethyl ketone and 45 parts of cyclohexanone was coated on the laminate (a-6) obtained in Example 14 by means of a bar coater No. 16 in the same way as in Example 1 to form a laminated structure having a transparent protective layer with a thickness of 2.0 μm.

The laminated structure showed an abrasion resistance of more than 2500 cycles, and in the salt spray test, spots occurred after the lapse of one day.

EXAMPLE 15

A silver-copper alloy layer having a thickness of 120 Å (Ag 92%, Cu 8%) and a titanium oxide layer having a thickness of 100 Å were successively laminated in this order to a biaxially stretched nylon 66 film having a light transmittance of 84% at 500 nm and a thickness of 50 μm to form a selective light-transmitting laminate (a-7).

The titanium oxide layer was formed by coating a solution consisting of 3 parts of tetrabutyl titanate tetramer and 97 parts of isopropyl alcohol by means of a bar coater, and heat-treating the coating at 60° C. for 3 minutes.

The silver-copper alloy layer was formed by sputtering using an Ag-Cu alloy target.

A coating solution consisting of 10 parts of a methacrylonitrile/2-hydroxyethyl methacrylate (90:10 by weight) copolymer ($\eta_{sp/c}=1.58$ dl/g, measured at 30° C. in a dimethyl formamide solution with c=0.5 g/dl) and 4 parts of triisocyanate T was coated on the resulting laminate (a-7) by means of a bar coater No. 10, and dried at 130° C. for 3 minutes to form a first layer having a thickness of 0.3 micron. Then, a coating solution consisting of 10 parts of polymethacrylonitrile ($\eta_{sp/c}=1.0$ dl/g, measured at 30° C. in a dimethyl formamide solution with c=0.5 g/dl), 45 parts of methyl ethyl ketone and 45 parts of cylohexanone was coated on the first layer by means of a bar coater No. 16, and dried at 150° C. for 3 minutes to form a laminated structure having a transparent protective layer with a thickness of 2.0 μm.

The laminated structure had an infrared reflectance (I-value) of 79% and a visible light transmittance of 64%. In the clockmeter test, the laminated structure showed an abrasion resistance of more than 3000 cycles. In the salt spray test, spots occurred after the lapse of 40 days. In the light resistance test, no change occurred in appearance after exposure for 2000 hours, and the laminated structure retained its basic optical properties.

EXAMPLE 16

A coating solution consisting of 16.8 parts of hexamethylene diisocyanate, 6.2 parts of ethylene glycol, 105 parts of cyclohexanone and 105 parts of methyl ethyl ketone was coated on the laminate (a-1) used to Example 1 by means of a bar coater No. 5, and dried at 130° C. for 3 minutes to form a first layer having a thickness of 0.3 micron. Then, a coating solution consisting of 10 parts of polymethacrylonitrile ($\eta_{sp/c}=1.0$ dl/g, measured at 30° C. in a dimethyl formamide solution with c=0.5 g/dl), 45 parts of methyl ethyl ketone and 45 parts of cyclohexanone was coated on the first layer by means of a bar coater No. 16, and dried at 130° C. for 3 minutes to form a laminated structure having a transparent protective layer with a thickness of 2.0 μm.

The laminated structure had an infrared reflectance (I-value) of 83% and a visible light transmittance of 59%. In the clockmeter test, the laminated structure had an abrasion resistance of more than 3000 cycles, and in the salt spray test, spots occurred after the lapse of 8 days.

EXAMPLE 17

A coating solution consisting of 18.8 parts of xylylene diisocyanate, 11.9 parts of N-methyldiethanolamine, 300 parts of cyclohexanone and 300 parts of methyl ethyl ketone was coated on the laminate (a-2) obtained in Example 2 by means of a bar coater No. 5, and dried at 130° C. for 3 minutes to form a first layer having a thickness of 0.3 micron. Then, a coating solution consisting of 10 parts of polymethacrylonitrile, 45 parts of methyl ethyl ketone and 45 parts of cyclohexanone, the same as that used in Example 1, was coated on the first layer by means of a bar coater No. 16, and dried at 130° C. for 3 minutes to form a laminated structure having a transparent protective layer with a thickness of 2.5 μm.

The laminated structure had an infrared reflectance (I-value) of 84% and a visible light transmittance of 60%. In the clockmeter test, the laminated structure showed an abrasion resistance of more than 3000 cycles, and no problem arose in practical application. In the salt spray test, spots formed after the lapse of 15 days, showing a marked improvement in spotting resistance.

EXAMPLE 18

A coating solution consisting of 19.4 parts of hexahydroxylylene diisocyanate, 10.6 parts of diethylene glycol, 150 parts of cyclohexanone and 150 parts of methyl ethyl ketone was coated on the laminate (a-3) obtained in Example 3 by means of a bar coater No. 5, and dried at 130° C. for 3 minutes to form a first layer having a thickness of 0.2 micron. Then, a coating solution consisting of 10 parts of polymethacrylonitrile, 45 parts of methyl ethyl ketone and 45 parts of cyclohexanone, the same as that used in Example 1, was coated on the first layer, and dried at 130° C. for 3 minutes to form a laminated structure having a transparent protective layer with a thickness of 2.0 μm.

The laminated structure had an infrared reflectance (I-value) of 74% and a visible light transmittance of 71%. In the clockmeter test, the laminated structure had an abrasion resistance of more than 3000 cycles, and no problem arose in practical application. In the salt spray test, spots formed after the lapse of 20 days.

EXAMPLE 19

A coating solution consisting of 22.2 parts of isophorone diisocyanate, 20.0 parts of polyethylene glycol (average molecular weight 200), 300 parts of cyclohexanone and 300 parts of methyl ethyl ketone was coated on the laminate (a-4) obtained in Example 4 and dried at 130° C. for 3 minutes to form a first layer having a thickness of 0.3 micron. Then, a coating solution consisting of 10 parts of polymethacrylonitrile, 50 parts of methyl ethyl ketone and 40 parts of cyclohexanone, the same as that used in Example 1, was coated on the first layer by means of a bar coater No. 16 and dried at 130° C. for 3 minutes to form a laminated structure having a transparent protective layer with a thickness of 2.0 μm.

The laminated structure had an infrared reflectance (I-value) of 78% and a visible light transmittance of 63%. In the salt spray test, spots occurred after the lapse of 7 days.

EXAMPLE 20

A coating solution consisting of 25 parts of diphenylmethane diisocyanate, 85.0 parts of polyethylene adipate sebacate having a hydroxyl group at both ends (average molecular weight 850) and 2800 parts of toluene was coated on the laminate (a-1) obtained in Example 1 by means of a bar coater No. 5, and dried at 130° C. for 3 minutes to form a first layer having a thickness of 0.3 micron. Then, a coating solution consisting of 10 parts of a methacrylonitrile/n-butoxyethyl methacrylate (90:10 by weight) copolymer ($\eta_{sp/c}$=1.84, measured at 30° C. in a dimethyl formamide solution with c=0.5 g/dl), 45 parts of methyl ethyl ketone and 45 parts of cyclohexanone was coated on the first layer by means of a bar coater No. 16, and dried at 125° C. for 3 minutes to form a laminated structure having a transparent protective layer with a thickness of 2.0 μm.

The laminate had a visible light transmittance of 56% and an infrared reflectance of 82%. In the clockmeter test, the laminated structure showed an abrasion resistance of more than 3000 cycles. In the salt spray test, spots occurred after the lapse of 18 days.

EXAMPLE 21

A coating solution consisting of 10 parts of polybutadiene diol (Nisso PB-G1000, a product of Nippon Soda K.K.), 21 parts of 2,2,4-/2,4,4-trimethylhexamethylene diisocyanate (50:50) and 80 parts of toluene was coated on the laminate (a-2) obtained in Example 2 by means of a bar coater No. 5, and dried at 130° C. for 3 minutes to form a first layer having a thickness of 0.3 micron. Then, a coating solution consisting of 10 parts of polyacrylonitrile ($\eta_{sp/c}$=1.95 dl/g, measured at 30° C. in a dimethyl formamide solution with c=0.5 g/dl) and 90 parts of dimethyl formamide was coated on the first layer by means of a bar coater No. 16, and dried at 180° C. for 3 minutes to form a laminated structure having a transparent protective layer with a thickness of 2.0 μm.

The laminated structure had an infrared reflectance (I-value) of 86% and a visible light transmittance of 63%. In the clockmeter test, the laminated structure showed an abrasion resistance of more than 3800 cycles, and no problem arose in practical application. In the salt spray test, spots formed after the lapse of 13 days.

EXAMPLE 22

An aluminum layer having a thickness of 100 Å was vacuum-deposited by a resistance heating method on a biaxially stretched polyethylene terephthalate film having a light transmittance at 500 nm of 86% and a thickness of 50 μm to form a selective light-transmitting laminate (a-8).

A coating solution consisting of 26.2 parts of 4,4'-dicyclohexylmethane diisocyanate, 6.7 parts of N-ethyl-diethanolamine, 3.1 parts of ethylene glycol, 50 parts of cyclohexanone and 50 parts of methyl ethyl ketone was coated on the laminate (a-8) by means of a bar coater No. 10 and dired at 130° C. for 3 minutes to form a first layer having a thickness of 0.3 micron. Then, a coating solution consisting of 10 parts of polymethacrylonitrile ($\eta_{sp/c}$=1.0 dl/g, measured at 30° C. in a dimethyl formamide solution with c=0.5 g/dl), 45 parts of methyl ethyl ketone and 45 parts of cyclohexanone was coated on the first layer by means of a bar coater No. 16, and dried at 130° C. for 3 minutes to form a laminated structure having a transparent protective layer with a thickness of 2.0 μm.

In the clockmeter test, the laminated structure showed an abrasion resistance of more than 3000 cycles, and in the salt spray test, spots formed after the lapse of 11 days.

EXAMPLE 23

A zirconium oxide layer having a thickness of 300 Å, a silver-copper alloy layer (Ag 92%, Cu 8%) having a thickness of 195 Å, and a zirconium oxide layer having a thickness of 280 Å were successively laminated in this order to a biaxially stretched polyethylene terephthalate film having a light transmittance at 500 nm of 86% and a film thickness of 50 μm to form a selective light-transmitting laminate (a-9).

Both of the zirconium oxide layers were formed by coating a solution consisting of 3 parts of tetrabutyl zirconate and 97 parts of isopropyl alcohol by means of a bar coater and heat-treating the coating at 120° C. for 3 minutes.

The silver-copper alloy layer was provided by vacuum deposition in accordance with a resistance heating method using an alloy consisting of 70% by weight of silver and 30% by weight of copper.

A coating solution consisting of 16.8 parts of hexamethylene diisocyanate, 6.2 parts of ethylene glycol, 105 parts of cyclohexanone and 105 parts of methyl ethyl ketone was coated on the resulting laminate (a-9) by means of a bar coater No. 5, and dried at 130° C. for 3 minutes to form a first layer having a thickness of 0.3 micron. Then, a coating solution consisting of 10 parts of polymethacrylonitrile ($\eta_{sp/c}$=1.0 dl/g, measured at 30° C. in a dimethyl formamide solution with c=0.5 g/dl), 45 parts of methyl ethyl ketone and 45 parts of cyclohexanone was coated on the first layer by means of a bar coater No. 16, and dried at 130° C. for 3 minutes to form a laminated structure having a transparent protective layer with a thickness of 2.0 μm.

The laminate had an infrared reflectance (I-value) of 84%, and a visible light transmittance of 54%. In the clockmeter test, the laminated structure showed an abrasion resistance of more than 3000 cycles, and in the salt spray test, spots formed after the lapse of 10 days.

EXAMPLE 24

A zirconium oxide layer having a thickness of 150 Å, a silver layer having a thickness of 190 Å and a zirconium oxide layer having a thickness of 250 Å were laminated in this order to a biaxially stretched polyethylene terephthalate film having a light transmittance at 500 nm of 86% and a thickness of 25 μm to form a selective light-transmitting laminate (a-10).

The zirconium oxide layers were formed by the reactive sputtering of zirconium.

A coating solution consisting of 18.8 parts of xylylene diisocyanate, 11.9 parts of N-methyldiethanolamine, 300 parts of cyclohexanone and 300 parts of methyl ethyl ketone was coated on the laminate (a-10) by means of a bar coater No. 5 and dried at 120° C. for 3 minutes to form a first layer having a thickness of 0.2 microns. Then, a coating solution consisting of 10 parts of polymethacrylonitrile, 45 parts of methyl ethyl ketone and 45 parts of cyclohexanone was coated on the first layer by means of a bar coater No. 16, and dried at 130° C. for 3 minutes to form a laminated structure having a transparent protective layer with a thickness of 2.0 μm.

The laminated structure had an infrared reflectance (I-value) of 84% and a visible light transmittance of 53%.

In the clockmeter test, the laminated structure showed an abrasion resistance of more than 3000 cycles, and no problem arose in practical application. In the salt spray test, spots formed after the lapse of 18 days, showing a marked increase in spotting resistance.

COMPARATIVE EXAMPLE 5

Polymethacrylonitrile was coated on the laminate (a-10) under the same conditions as in Comparative Example 1 to form a laminated structure having a transparent protective coating with a thickness of 2 μm.

The resulting laminated structure had an infrared reflectance (I-value) of 82% and a visible light transmittance of 52%. In the salt spray test, spots formed after the lapse of one day.

POLYMERIZATION EXAMPLE 1

A methacrylonitrile/2-hydroxyethyl methacrylate copolymer in a weight ratio of 90:10 (to be referred to as copolymer 1) was formed in the following manner.

In a 1-liter four-necked separable flask equipped with a stirrer, a thermometer, a condenser and a nitrogen introducing tube, 170 ml of water boiled and deaerated, 90 g of methacrylonitrile, 10 g of 2-hydroxyethyl methacrylate, 2.5 g of sodium lauryl sulfate, and 0.2 g of tertiary dodecylmercaptan were mixed, and emulsified at 75° C. for 30 minutes under a stream of nitrogen. Then, 0.9 g of potassium persulfate was added, and the mixture was reacted at the same temperature for 10 hours. After the reaction, 2 liters of the reaction mixture was transferred to a beaker, and 300 ml of methanol was added. Further, 20 g of a saturated aqueous solution of sodium chloride was added to complete the flocculation of the latex. The resulting suspension was heated with stirring at 60° to 70° C. for 30 minutes and filtered. The precipitate was washed with 1 liter of water twice and 500 ml of methanol twice, and dried. There was obtained 79 g (yield 79%) of the captioned copolymer having an $\eta_{sp/c}$ of 2.35 dl/g (measured at 30° C. in dimethyl formamide solution in a concentration of 0.5 g/dl).

POLYMERIZATION EXAMPLES 2 TO 4

Similarly to Polymerization Example 1, copolymers 2 to 4 were synthesized. The structural units and viscosities of these copolymers are shown in Table 1 below.

TABLE 1

| Example No. | Copolymer | Structural unit (II-a) | (II-b) | 3rd component Third component | (II-a)/(II-b)/ $\eta_{sp/c}$ weight ratio | (*) |
|---|---|---|---|---|---|---|
| 2 | 2 | $R_1$ = methyl | $R_2$ = methyl $R_3$ = —CH$_2$O—n-C$_4$H$_9$ | — | 90/10/0 | 1.83 |
| 3 | 3 | $R_1$ = methyl | $R_2$ = H $R_3$ = —CH$_2$O—⟨phenyl⟩ | — | 90/10/0 | 1.25 |
| 4 | 4 | $R_1$ = methyl | $R_2$ = methyl $R_3$ = H | n-Butoxyethyl methacrylate | 85/5/10 | 1.50 |

(*): Measured at 30° C. in a dimethyl formamide solution in a concentration of 0.5 g/dl.

POLYMERIZATION EXAMPLE 5

A copolymer 5 ($R_1 = R_2 =$ methyl, $$R_3 = -CH_2N\begin{array}{l}CH_2CH_2OH\\ \\ CH_2CH_2OH\end{array};$$

the (II-a)/(II-b) weight ratio=85:15) was prepared in the following manner.

A 500 ml. four-necked flask equipped with a stirrer, a condenser, a thermometer and a nitrogen introducing tube was charged with 85 g of methyl methacrylate, 21.3 g of glycidyl methacrylate, 100 ml of dioxane and 0.70 g of azobisisobutyronitrile, and the monomers were polymerized at 60° C. for 6 hours. After the reaction, 300 ml of dioxane was added to dilute the reaction mixture. The diluted mixture was poured into 3 liters of water with stirring to re-precipitate it. The precipitate was separated by filtration and dipped in methanol. The precipitate was again separated by filtration, and dried under reduced pressure at 60° C. to give 92 g of a methyl methacrylate/glycidyl methacrylate copolymer. Furthermore, the copolymer was dissolved in 200 ml of dioxane, and 15.75 g of diethanolamine and 0.8 g of triethylbenzyl ammonium iodide were added, and the reaction was carried out at 60° C. for 3 hours. The reaction mixture was reprecipitated with water. The precipitate was washed with methanol, and dried under reduced pressure at 60° C. to form 100 g (yield 90%) of the captioned polymer. The polymer had a viscosity, $\eta_{sp/c}$ measured at 25° C. in chloroform in a concentration of 0.5 g/dl, of 0.40 dl/g.

EXAMPLE 25

A coating solution consisting of the methacrylonitrile copolymer 1 obtained in Polymerization Example 1, 0.5 part of triisocyanate T, 45 parts of methyl ethyl ketone and 45 parts of cyclohexanone was coated on the laminate (a-1) obtained in Example 1 by means of a bar coater No. 16 and dried at 130° C. for 3 minutes to form a laminated structure having a transparent protective layer with a thickness of 2.0 μm.

The laminated structure had an infrared reflectance (I-value) of 82% and a visible light transmittance of 59%. In the clockmeter test, the laminated structure showed an abrasion resistance of more than 2500 cycles, and in that salt spray test, spots formed after the lapse of 25 days.

EXAMPLE 26

A coating solution consisting of 10 parts of the methacrylonitrile copolymer 2 obtained in Polymerization Example 2, 1.0 part of triisocyanate T, 45 parts of methyl ethyl ketone and 45 parts of cyclohexanone was coated on the laminate (a-2) obtained in Example 2 by means of a bar coater No. 16, and dried at 130° C. for 3 minutes to form a laminated structure having a transparent protective layer with a thickness of 2.0 μm.

The laminated structure had an infrared reflectance (I-value) of 79% and a visible light transmittance of 64%. In the clockmeter test, the laminated structure showed an abrasion resistance of more than 3000 cycles, and no problem arose in practical application. In the salt spray test, spots formed after the lapse of 25 days, showing a marked improvement in spotting resistance.

EXAMPLE 27

A coating solution consisting of 10 parts of the copolymer 3 obtained in Polymerization Example 3, 1.0 part of triisocyanate T, 45 parts of methyl ethyl ketone and 45 parts of cyclohexanone was coated on the laminate (a-3) obtained in Example 3 by means of a bar coater No. 16, and dried at 130° C. for 3 minutes to form a laminated structure having a transparent protective layer with a thickness of 2.0 μm.

The laminated structure had an infrared reflectance (I-value) of 70% and a visible light transmittance of 72%. In the clockmeter test, the laminated structure showed an abrasion resistance of more than 2500 cycles, and no problem arose in practical application. In the salt spray test, spots did not form even after the lapse of 40 days.

EXAMPLE 28

A coating solution consisting of 10 parts of the copolymer 5 obtained in Polymerization Example 5, 0.5 part of xylylene diisocyanate and 90 parts of dimethyl acetamide was coated on the laminate (a-4) obtained in Example 4 by means of a bar coater No. 16, and dried at 130° C. for 3 minutes to form a laminated structure having a transparent protective layer with a thickness of 2.0 μm.

The resulting laminated structure had an infrared reflectance (I-value) of 81% and a visible light transmittance of 66%. In the salt spray test, spots formed after the lapse of 30 days, showing a marked improvement in spotting resistance.

EXAMPLE 29

A coating solution consisting of 10 parts of the methacrylonitrile copolymer 4 obtained in Polymerization Example 4, 1.0 part of triisocyanate T, 45 parts of methyl ethyl ketone and 45 parts of cyclohexanone was coated on the laminate (a-1) obtained in Example 1 by means of a bar coater No. 16, and dried at 130° C. for 3 minutes to form a laminated structure having a transparent protective coating with a thickness of 2.0 μm.

The resulting laminated structure had a visible light transmittance of 50% and an infrared reflectance (I-value) of 79%. In the clockmeter test, it showed an abrasion resistance of more than 2000 cycles, and in the salt spray test, spots formed after the lapse of 20 days.

EXAMPLE 30

A coating solution consisting of 10 parts of the copolymer 2, 0.5 part of hexamethylene diisocyanate, 45 parts of methyl ethyl ketone and 45 parts of cyclohexanone was coated on the laminate (a-2) obtained in Example 2 by means of a bar coater No. 16, and dried at 130° C. for 3 minutes to form a laminated structure having a transparent protective layer with a thickness of 2.0 μm.

The laminated structure had an infrared reflectance (I-value) of 81% and a visible light transmittance of 66%. In the clockmeter test, it showed an abrasion resistance of more than 2500, and no problem arose in practical application. In the salt spray test, spots formed after the lapse of 25 days, showing a marked improvement in spotting resistance.

EXAMPLE 31

A coating solution consisting of 10 parts of the copolymer 2, 0.5 part of isophorone diisocyanate, 45 parts of methyl ethyl ketone and 45 parts of cyclohexanone was coated on the laminate (a-3) used in Example 3 by means of a bar coater No. 16, and dried at 120° C. for 3 minutes to form a laminated structure having a transparent protective layer with a thickness of 2.0 μm.

The laminated structure had an infrared reflectance (I-value) of 79% and a visible light transmittance of 62%. In the clockmeter test, it showed an abrasion resistance of more than 2500, and no problem arose in practical application. In the salt spray test, spots did not form even after the lapse of 22 days.

EXAMPLE 32

An aluminum layer having a thickness of 100 Å was formed on a biaxially stretched polyethylene terephthalate film having a light transmittance at 500 nm of 86% and a thickness of 50 μm by vacuum deposition in accordance with a resistance heating method to form a selective light-transmitting laminate (a-11).

A coating solution consisting of 10 parts of the methacrylonitrile copolymer 1 obtained in Polymerization Example 1, 0.5 part of triisocyanate T, 45 parts of methyl ethyl ketone and 45 parts of cyclohexanone was coated on the resulting laminate (a-11) by means of a bar coater No. 16 and dried at 130° C. for 3 minutes to form a laminated structure having a transparent protective coating with a thickness of 2.0 μm.

The laminated structure showed an abrasion resistance of more than 2800 cycles in the clockmeter test. In the salt spray test, spots formed after the lapse of 15 days.

EXAMPLE 33

The light resistance was measured by an ultraviolet carbon arc lamp-type resistance tester (Glass Enclosed Carbon-Arc Type Apparatus for Artificial Light Exposure Tests, JIS B7751) in such a manner that the light which was transmitted through the glass plate fell directly upon the protective layer.

Table 2 shows the results of sample tests.

TABLE 2

| Samples | Exposure time (hrs.) | Appearance change |
|---|---|---|
| Example 1 | 2500 | no |
| 2 | 2000 | no |
| 3 | 2500 | no |
| 4 | 2000 | no |

TABLE 2-continued

| Samples | Exposure time (hrs.) | Appearance change |
| --- | --- | --- |
| 5 | 2000 | no |
| 6 | 2000 | no |
| 7 | 2500 | no |
| 8 | 2000 | no |
| 9 | 2500 | no |
| 10 | 2500 | no |
| 11 | 2000 | no |
| 12 | 2000 | no |
| 15 | 2500 | no |
| 16 | 2500 | no |
| 17 | 2500 | no |
| 18 | 2500 | no |
| 19 | 2000 | no |
| 20 | 2500 | no |
| 21 | 2000 | no |
| 23 | 2000 | no |
| 25 | 2000 | no |
| 26 | 2000 | no |
| 27 | 2500 | no |
| 28 | 2500 | no |
| 29 | 2500 | no |
| 30 | 2000 | no |
| 31 | 2000 | no |

What we claim is:

1. In a selective light-transmitting laminated structure comprising (a) a laminate composed of a transparent substrate and formed on at least one surface of the substrate, a thin metallic layer having a thickness of 30–500 Å if required in combination with a thin film layer having a high refractive index, and (b) a protective layer coated on said laminate (a) and composed mainly of a polymer having structural units of the general formula

wherein R represents a hydrogen atom or a methyl group, as main structural units, the improvement wherein the corrosion resistance of said structure is improved by providing a urethan linkage in the interface between the laminate (a) and the protective layer (b).

2. The structure of claim 1 wherein said urethan linkage is derived from a urethan linkage-containing polymer layer existing between the laminate (a) and the protective layer (b).

3. The structure of claim 2 wherein the protective layer (b) is free from a urethan linkage.

4. The structure of claim 2 wherein the protective layer (b) is composed substantially only of the structural units of the formula

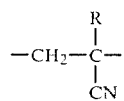

in which R is as defined in claim 1.

5. The structure of claim 2 wherein the urethan-linkage-containing polymer is insoluble in organic solvents used in forming a coating solution for the protective layer (b).

6. The structure of claim 2 wherein the urethan linkage-containing polymer has a three-dimensional network structure.

7. The structure of claim 2 wherein the urethan linkage-containing polymer is formed by the reaction of a polymer having a hydroxyl group in a side chain with a difunctional or higher polyisocyanate.

8. The structure of claim 7 wherein the polymer having a hydroxyl group in a side chain is a polymer containing at least 2 mole% of structural units of the following formula

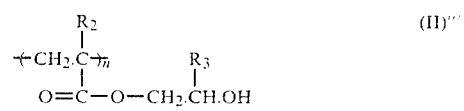

wherein $R_2$ represents a hydrogen atom or a methyl group, $R_3$ represents a hydrogen atom, a group of the formula $-CH_2-OR_7$ in which $R_7$ represents an alkyl group having 1 to 6 carbon atoms or a phenyl group, or a group of the formula

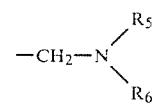

in which $R_5$ and $R_6$ are identical or different and each represents an alkyl group having 1 to 6 carbon atoms, a 2-hydroxyethyl group or a 2-hydroxypropyl group, and n is an integer.

9. The structure of claim 7 wherein the polymer having a hydroxyl group in a side chain is a hydroxyl-containing copolymer composed mainly of structural units of the formula

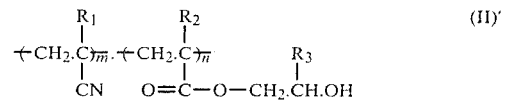

wherein $R_1$ represents a hydrogen atom or a methyl group, m is an integer, and $R_2$ represents a hydrogen atom or a methyl group, $R_3$ represents a hydrogen atom, a group of the formula $-CH_2-OR_7$ in which $R_7$ represents an alkyl group having 1 to 6 carbon atoms or a phenyl group, or a group of the formula

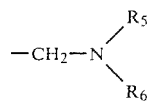

in which $R_5$ and $R_6$ are identical or different and each represents an alkyl group having 1 to 6 carbon atoms, a 2-hydroxyethyl group or a 2-hydroxypropyl group, and n is an integer.

10. The structure of claim 1 wherein the polymer which constitutes the protective layer (b) contains said urethan linkage.

11. The structure of claim 10 wherein the protective layer (b) is composed of a crosslinked urethan polymeric compound formed by reacting a hydroxyl-containing copolymer composed mainly of structural units of the formula

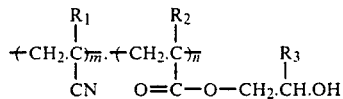

wherein $R_1$ represents a hydrogen atom or a methyl group, $R_2$ represents a hydrogen atom or a methyl group, $R_3$ represents a hydrogen atom, a group of the formula $-CH_2-OR_7$ in which $R_7$ represents an alkyl group having 1 to 6 carbon atoms or a phenyl group, or a group of of the formula

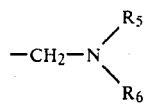

in which $R_5$ and $R_6$ are identical or different and each represents an alkyl group having 1 to 6 carbon atoms, a 2-hydroxyethyl group or a 2-hydroxypropyl group, m is an integer and n is an integer with a polyisocyanate whereby at least a part of the hydroxyl groups in the copolymer reacts to form a urethan crosslinkage.

12. The structure of any one of claims 1 to 10 which is used as a windowpane in buildings and vehicles.

13. The structure of claim 12 wherein the windowpane is an openable, double window, and the laminated structure is provided on that surface of the indoor-facing glass plate which faces outdoors.

14. The structure of claim 2 wherein the proportion of the urethan linkage in the urethan linkage-containing polymer is from 0.1 to 5 millimoles/g.

15. The structure of claim 2 wherein the layer of the urethan linkage-containing polymer between the laminate (a) and the protective layer (b) has a thickness of from about 0.1 to about 0.4 micron and the protective layer (b) coated on the urethan linkage-containing polymer has a thickness of from about 2.0 to about 3.0 microns.

16. The structure of claim 10 or claim 11 wherein the protective layer (b) containing said urethan linkage has a thickness of about 2 microns.

17. The structure of claim 1 wherein said thin film layer having a high refractive index is present and has a thickness of 40 to 600 Å.

* * * * *